US012301746B1

(12) United States Patent
Durfee, Jr.

(10) Patent No.: US 12,301,746 B1
(45) Date of Patent: May 13, 2025

(54) RETRACTABLE GRIP ELEMENT FOR CELL PHONES

(71) Applicant: David L Durfee, Jr., Meadville, PA (US)

(72) Inventor: David L Durfee, Jr., Meadville, PA (US)

( * ) Notice: Subject to any disclaimer, the term of this patent is extended or adjusted under 35 U.S.C. 154(b) by 0 days.

(21) Appl. No.: 18/596,594

(22) Filed: Mar. 5, 2024

(51) Int. Cl.
*H04B 1/38* (2015.01)
*H04M 1/02* (2006.01)
*H04M 1/04* (2006.01)

(52) U.S. Cl.
CPC ............ *H04M 1/0281* (2013.01); *H04M 1/04* (2013.01)

(58) Field of Classification Search
CPC ........ H04M 1/0281; H04M 1/04; H04M 1/12; H04M 1/0252; H04M 1/23; H04M 1/21
See application file for complete search history.

(56) References Cited

U.S. PATENT DOCUMENTS

| | | | | |
|---|---|---|---|---|
| 11,190,227 B2* | 11/2021 | Barnett | ................ | F16M 13/022 |
| 2010/0320341 A1* | 12/2010 | Baumann | .............. | F16B 47/006 |
| | | | | 248/299.1 |
| 2019/0052297 A1* | 2/2019 | Lee | ........................ | B62J 50/225 |
| 2023/0378991 A1* | 11/2023 | Zhang | ................... | F16M 11/14 |

* cited by examiner

*Primary Examiner* — Tuan Pham
(74) *Attorney, Agent, or Firm* — Richard K Thomson

(57) ABSTRACT

A retractable grip element for a cell phone is provided with new features to enhance its functionality. A nest can be secured to or made one with the phone case. The nest affords attachment feature for the retractable grip element and recesses for fingers to extend the retractable grip element. The retractable grip element is provided with a post that, when attached to the grip shield, can function with a push button release to automatically extend the retractable grip element. When attached to the base of the retractable grip element, the laterally moving slide provides a release that permits the retractable grip element to be replaced.

8 Claims, 11 Drawing Sheets

RETRACTABLE GRIP ELEMENT FOR CELL PHONES

BACKGROUND AND SUMMARY OF THE INVENTION

This application is a sister application to U.S. patent application Ser. No. 18/215,783 filed Jun. 28, 2023 which is hereby incorporated herein by reference in its entirety.

The present invention is directed to the field of telecommunications. More particularly, the present invention is directed to apparatus for facilitating the handling of cell phones, ipads, and the like.

Cell phones and other electronic devices such as ipads, are exploding in popularity and utilization. It is not uncommon for individuals to have 2 or 3 phones for different applications. With all the bells and whistles available for cell phones, cameras, internet, a variety of apps, it is not uncommon for phones to sell for in excess of $4000. As detailed in Applicant's earlier patent, U.S. Pat. No. 10,368,628, one of the greatest needs is for a better way to grasp the phone for utilization. Ensuring the cell phone is not damaged or destroyed as a result of an unnecessary droppage is of paramount importance.

An important step was made in this regard by Pop Socket with features detailed in U.S. Pat. No. 8,560,031. A retractable accordion grip element is attached to the back of the cell phone or its case to facilitate handling. However, such devices have proved to be suspect for allowing the phone to slip inadvertently from the user's hand.

It is among the objects of the present invention to provide a retractable grip element which can be attached to provide a push-button feature which allows the retractable grip element to be extended with a pushing of a release button and then restored to its collapsed position with a simple downward collapse of the retractable grip element. The grip element extends behind the fingers of the user and, in essence, grips the user's hand, avoiding any "fumble fingers" incidents which can damage or destroy the phone. In addition, the retractable grip element of the present invention is provided with a downwardly protruding flange which protects the button from catching on pockets or purse paraphernalia making the original device more user friendly.

A secondary feature of the present invention is to provide a release mechanism that permits the retractable grip element to be removed and replaced with a different one. The generally circular element on the top of the grip shield optionally has a printable surface bearing a team identification (name/logo, etc). Removability provides a second way for the logos to be changed for the various teams/seasons.

The present invention includes an accessory for enhancing the grasping of a cell phone, the accessory having an extendable and collapsible grip element featuring an upper wall and a lower base and secured to a surface portion of a cell phone case, an improvement comprising: a) a downwardly protruding post, the downwardly protruding post having a radially outwardly extending flange protruding from a distal end; b) a radially inwardly extending flange associated with a securing element for grasping a neck portion above the radially extending flange to secure the post. In a first embodiment, the downwardly protruding post extends from a lower surface of the upper wall. Preferably, the radially inwardly extending flange is formed on a laterally moving slide element. The extendable and collapsible grip element houses a coiled spring and the laterally moving slide element comprises a pushbutton release finger which, when engaged, allows the coiled spring within the extendable and collapsible grip element to extend automatically.

The improvement further includes a cylindrical nest protruding from a portion of a surface portion of the case surrounding the extendable and collapsible grip element. In this embodiment, the downwardly protruding post is attached to a lower portion of the base. In this configuration, the laterally moving slide element comprises a pushbutton release finger which, when engaged, allows the extendable and collapsible grip element to be removed from the nest. The improvement includes a pair of flexing arms which extend from the laterally moving element and engage slots in an interior wall portion of the nest, the pair of flexing arms serving to bias the pushbutton release finger to a locked position, The cylindrical nest has inwardly extending, spring-biased buttons which flex outwardly to receive a plate secured to a bottom extent of said extendable and collapsible grip element and flex inwardly to secure said plate and said extendable and collapsible grip element secured thereto.

Various other features, advantages, and characteristics of the present invention will become apparent after a reading of the following detailed description.

BRIEF DESCRIPTION OF THE DRAWINGS

The preferred embodiment(s) of the grip shield of the present invention is/are described in conjunction with the associated drawings in which like features are indicated with like reference numerals and in which.

DETAILED DESCRIPTION OF THE PREFERRED EMBODIMENT(S)

A first embodiment of retractable grip element of the present invention is depicted in FIGS. 1A-2C generally at 30 in conjunction with nest 20. Extendable and retractable grip element 30 comprises a conical accordion element 15 (FIG. 2B) with grip shield 13 secured to the top (as described and claimed in related U.S. patent application Ser. No. 18/215,783). Nest 20 is secured to the phone case 11 and surrounds the retractable grip element 30. As shown in FIGS. 2A, nest 20 has a plurality of finger access recesses 22 to permit manual extension of grip element 30. As best seen in FIG. 2B, a post 17 has a radially outwardly extending flange 17A secured to the bottom or base 19 of accordion element 15 is affixed to nest 20 with radially inwardly extending flange 19A capturing radially outwardly extending flange 17A. Bottom 24 of nest 20 is formed integrally therewith.

Second embodiment of retractable grip element 30' is shown in FIGS. 3A-3F. In this embodiment, nest 20' may be secured to phone case 11' or made integrally therewith. A preferred method of attachment in the first embodiment involves a glue pad on the bottom of plate 32. In this second embodiment, a series of four spring-biased buttons 24' flex outwardly (toward nest 20') to permit the plate 32' fastened to the end of post 28' to snap into the recess provided therefor, and then outwardly over the plate 32' (FIG. 3E) to secure it in nest 20'.

Figures 1A, 1B:
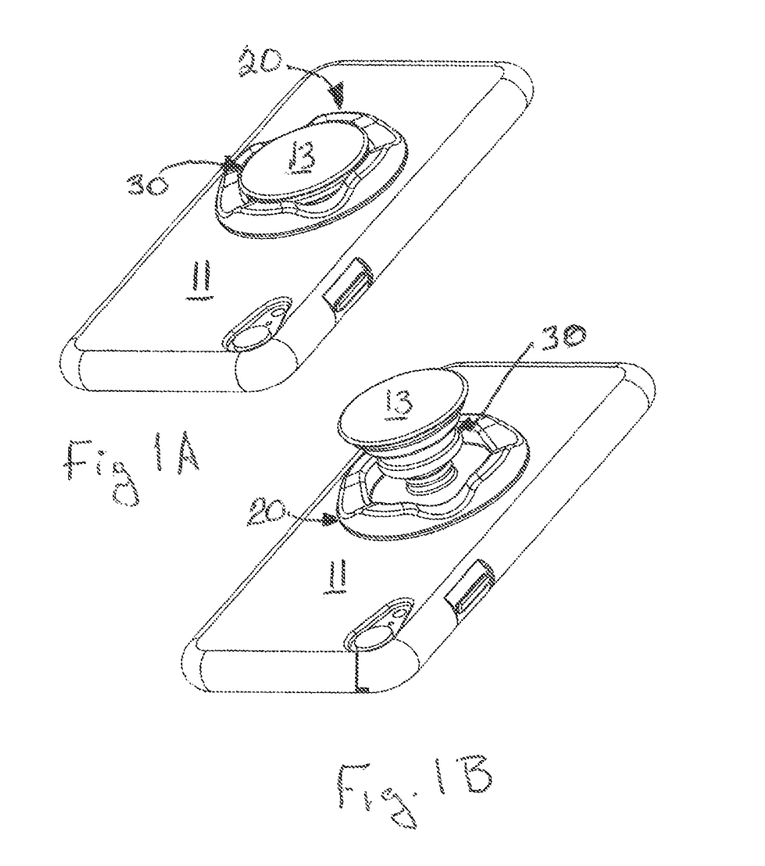
FIG. 1A is a top perspective view of a first embodiment of the retractable grip element of the present invention attached to a cell phone shown in collapsed position.
FIG. 1B is a top perspective view of the first embodiment of the retractable grip element of the present invention shown in in FIG. 1A depicted in an extended position.
Figure 2A:
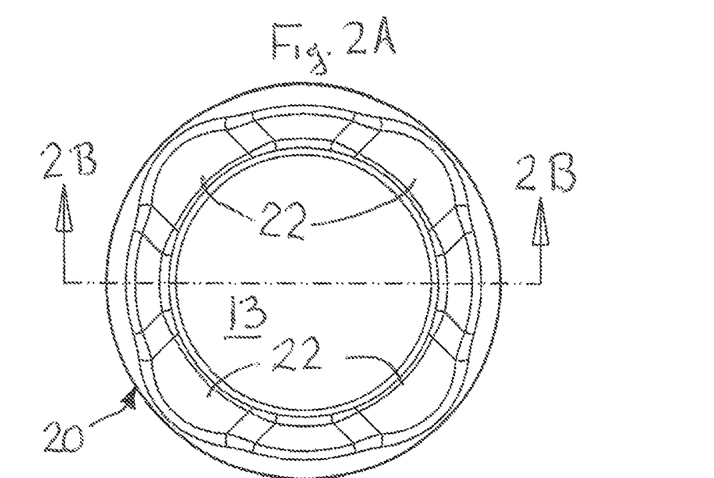
FIG. 2A is a top view of the first embodiment shown in FIG. 1A in an extended position.
Figure 2B:
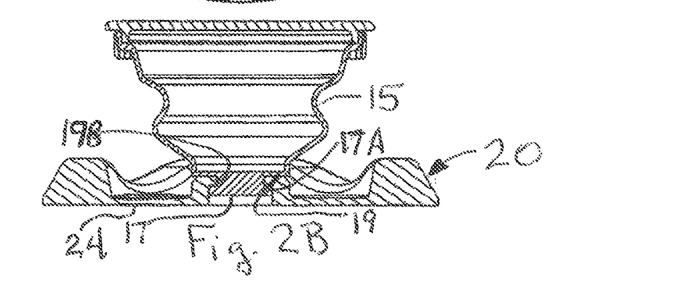
FIG. 2B is a cross-sectional side view of the first embodiment and seen along lines 2B-2B in FIG. 2A.
Figure 2C:
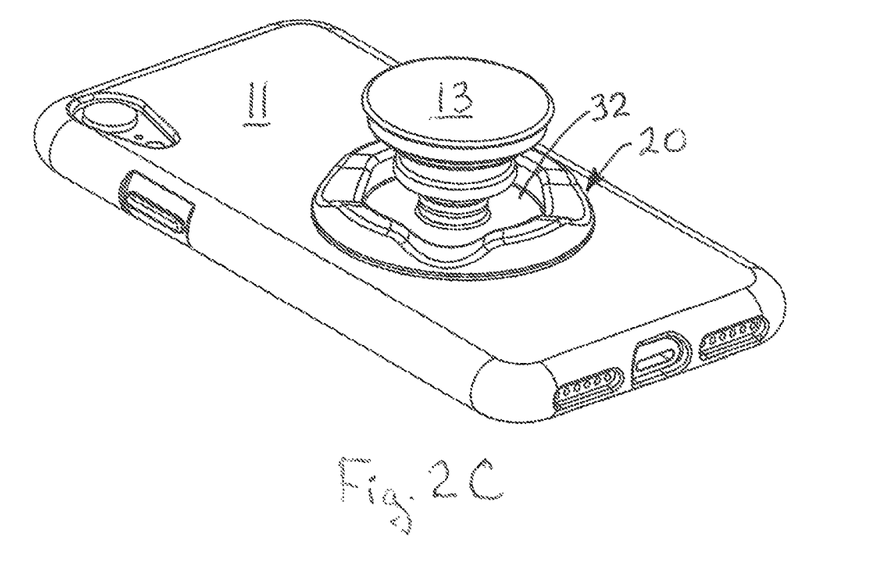
FIG. 2C is a top perspective view of the first embodiment as seen in FIG. 2A.
Figure 3A:
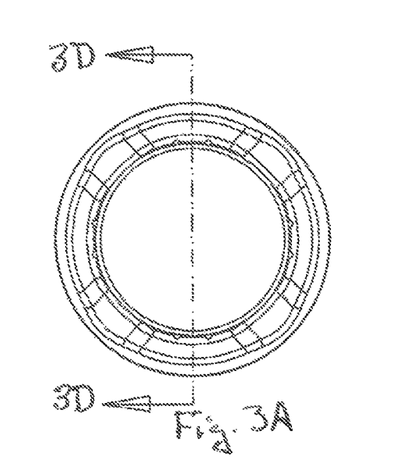
FIG. 3A is top view of a second embodiment of the retractable grip element of the present invention.
Figures 3B, 3C, 3E, 3F:
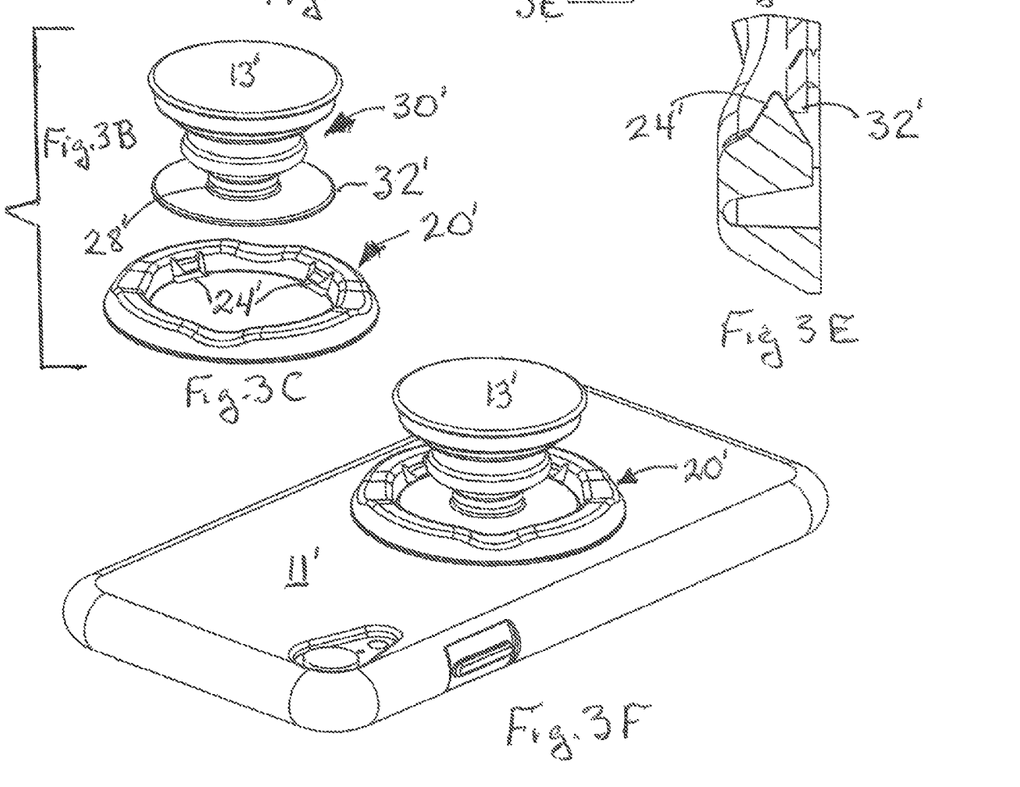
FIG. 3B is a side perspective view of the second embodiment.
FIG. 3C is a cross-sectional view of the second embodiment.
FIG. 3E is an enlarged partial side view taken from circle 3E in FIG. 3D.
FIG. 3F is an enlarged side perspective view of the second embodiment shown affixed to a cell phone.
Figure 3D:
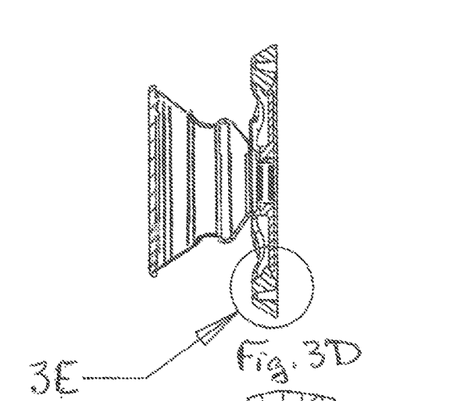
FIG. 3D is a cross-sectional side view of the second embodiment as seen along line 3D-3D in FIG. 3A.
Figure 4:
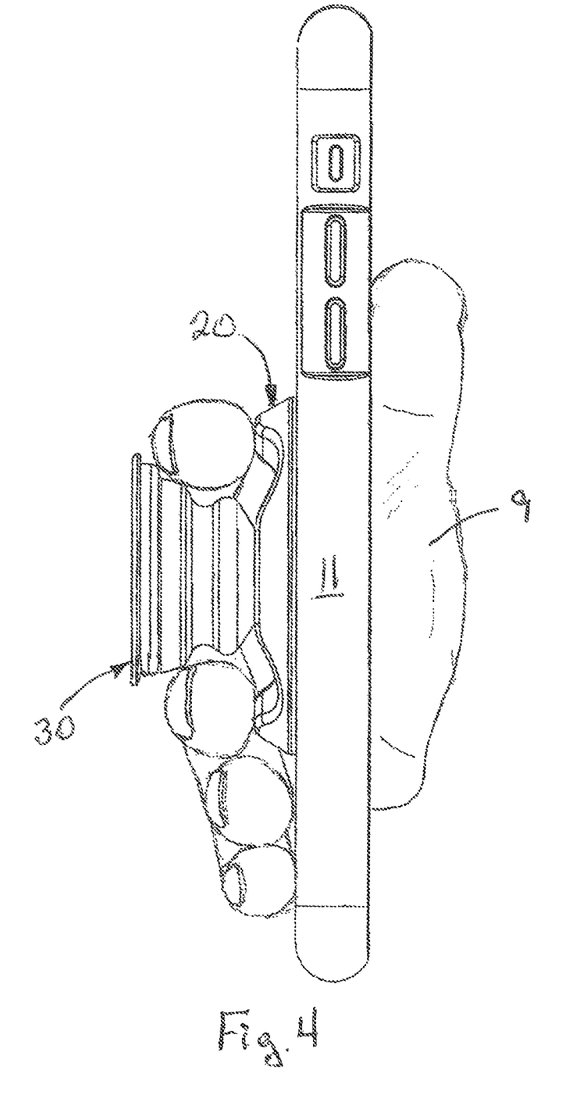
FIG. 4 is a side view of a cell phone employing the hand-held retractable grip element of the present invention.

FIG. 4 depicts cell phone case 11 with nest 20 and extendable and retractable grip element 30 being held by hand 9. It will be seen that the combination of nest 20 and retractable grip element 30 in effect grip the fingers of hand 9 avoiding the possibility of droppage.

Figure 5:
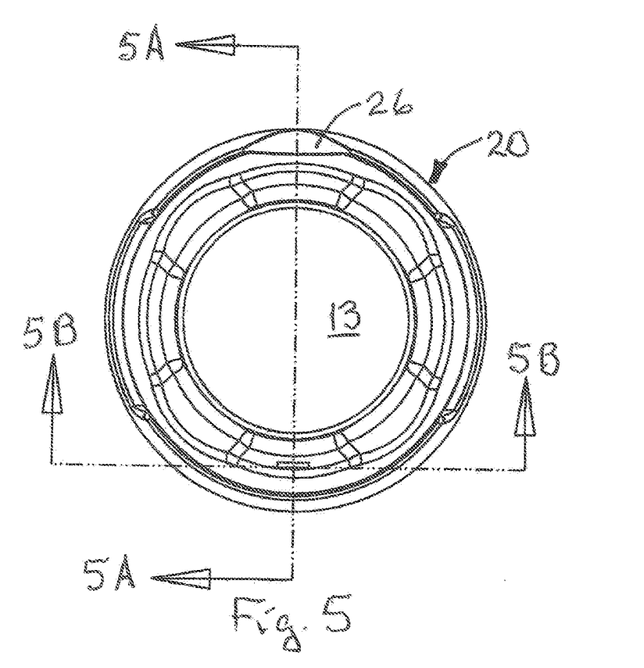
FIG. 5 is a top view of a third embodiment of the present invention featuring a pocket clip.
Figure 5A:
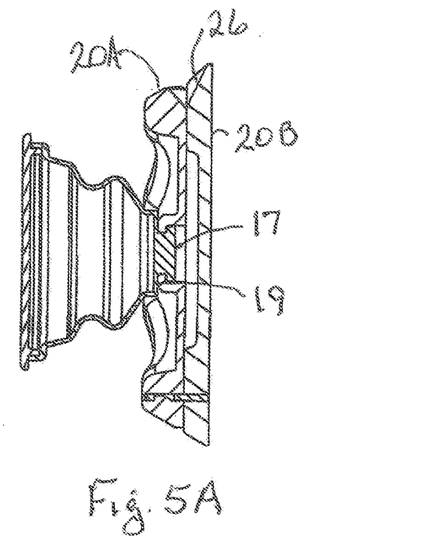
FIG. 5A is a cross-sectional side view taken along line 5A-5A of FIG. 5.
Figure 5B:
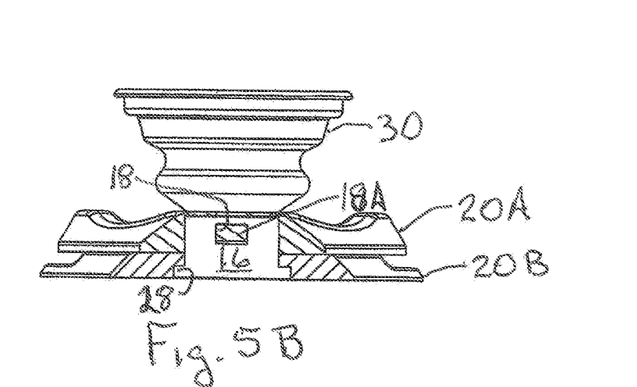
FIG. 5B is a section view as seen along line 5B-5B in FIG. 5.
Figures 6A, 6B, 6C:
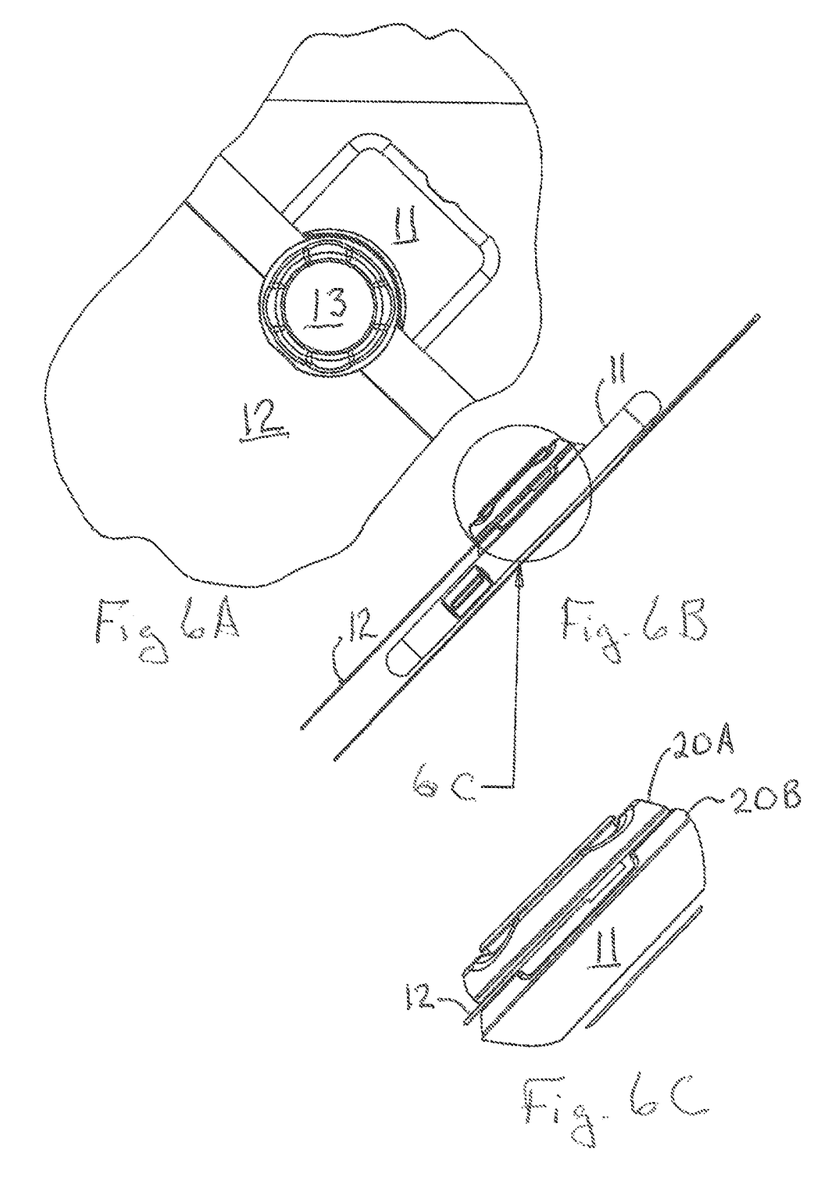
FIG. 6A is a front view of the third embodiment of the retractable grip element seated in a pocket.
FIG. 6B is a side view of the third embodiment shown in FIG. 6A seated in a pocket.
FIG. 6C is a detailed side view enlarged from circle 6C in FIG. 6B.

FIG. 5-6C show third embodiment, a pocket clip, of nest 20. As in the first embodiment, post 17 is attached to the bottom 19 of extendable and retractable grip element 30. In this embodiment, nest 20 includes first upper element 20A and second lower element 20B which has a lip 26 which can engage over the upper edge 14 of pocket 12 (FIG. 6A) allowing phone 11 and lower element 20B to slide inside the pocket 12 (FIG. 6B) while collapsed retractable grip element 30 and upper element 20A sit outside the pocket 12. Flex connector 16 snaps into a recess 28 in bottom element 20B and opening 18 snaps over the end of protrusion 18A providing the flex or modest clamshell movement needed to allow lower element 20B to move outwardly from upper element 20A to accommodate pocket 12.

Figure 7:
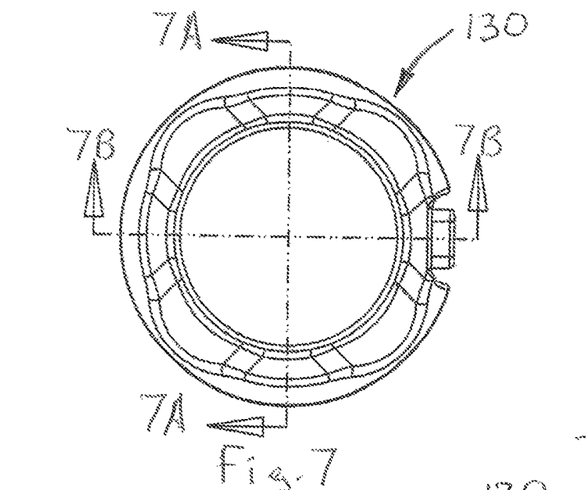
FIG. 7 is a top view of a fourth embodiment featuring a featuring a flex cam latch for the retractable grip element.
Figure 7A:
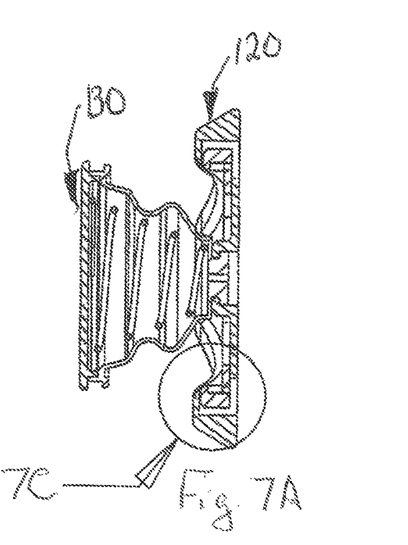
FIG. 7A is a cross-sectional side view as seen along line 7A-7A in FIG. 7.
Figure 7B:
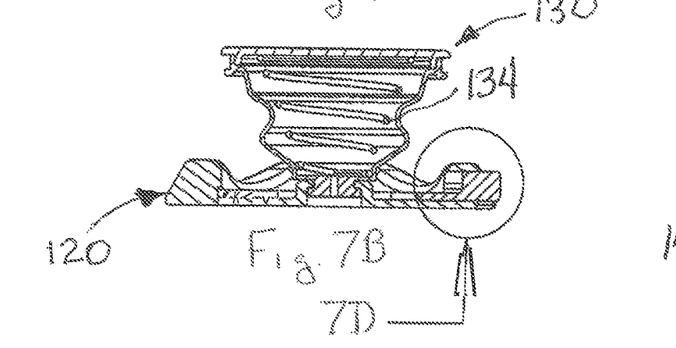
FIG. 7B is a cross-sectional bottom view as seen along line 7B-7B in FIG. 7.
Figure 7C:
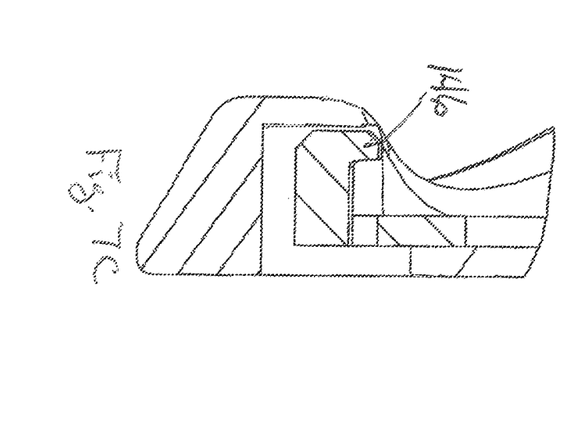
FIG. 7C is a detailed view of the bottom end of the nest as seen in circle 7C in FIG. 7A.
Figure 7D:
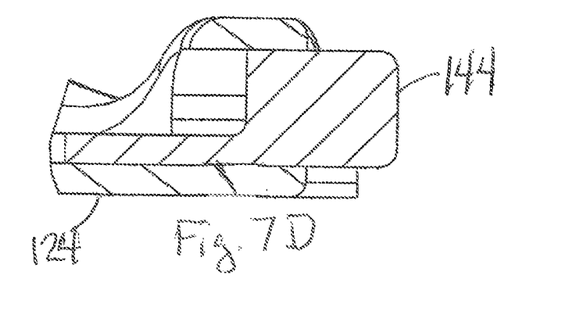
FIG. 7D is a detailed view of the right end of the nest as seen in circle 7D in FIG. 7B.
Figure 7E:
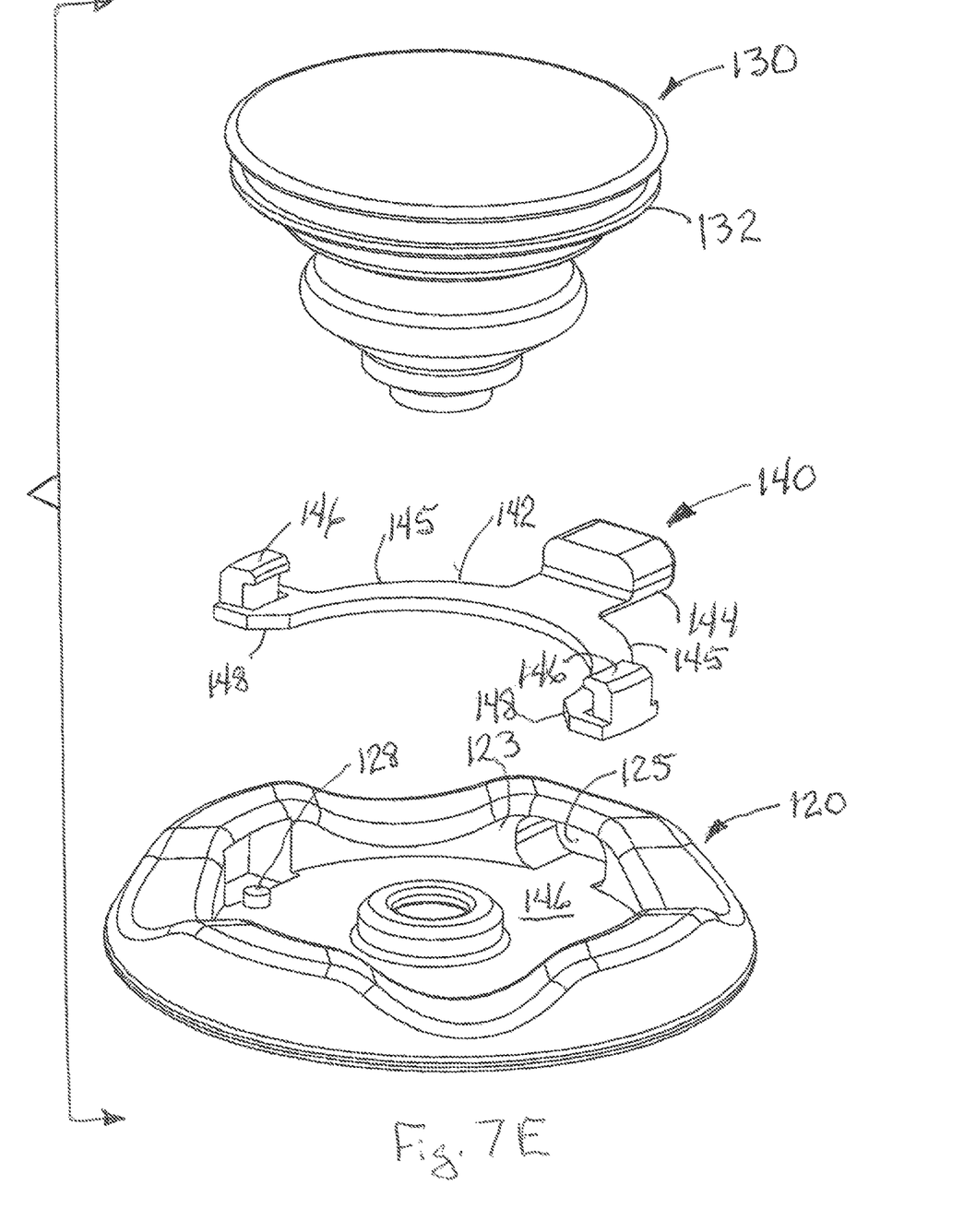
FIG. 7E is an enlarged expanded view of a form of the fourth embodiment shown in FIG. 7.

FIG. 7-7E depict a fourth embodiment of the extendable and retractable grip element 130. In this fourth embodiment 130, nest 120 is equipped with a push button release mechanism 140. As seen in FIG. 7E, one configuration of the push button release mechanism is a C-shaped spring element 142 with push button 144 extending from a central region of the C-shaped spring element 142 through opening 125 in wall 123 of nest 120. At the end of each arm 145 is a vertically extending L-shaped arm 146 positioned adjacent an angled camming surface 148. C-shaped spring element 142 lies on and slides over upper surface 126 of bottom element 124 of nest 120. L-shaped arms 146 engage a radially outwardly extending flange 132 on extendable and retractable grip element 130. When push button 144 is manually engaged and slid toward the left (FIG. 7D), angled camming surfaces 148 engage stationary pins 128 protruding upwardly from upper surface 126 of bottom element 124 flexing spring arms 145 outwardly causing L-shaped arms 146 to release their hold on radially outwardly extending flange 132 allowing spring means 134 (shown here as a coil spring) to "automatically" extend extendable and retractable grip element 130 to its extended position. This obviates the need to insert one's fingers under the top portion of extendable and retractable grip element 130. It will be understood that spring means 134 could alternatively take the form of a pneumatic spring in which a pre-inflated balloon type element causes a pre-folded scored accordion grip element 130 to expand upon release.

Figure 8:
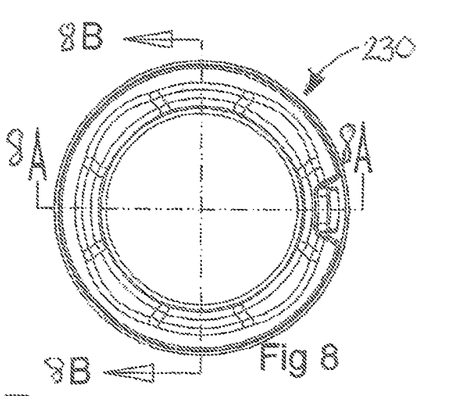
FIG. 8 is a top view of a fifth embodiment of the retractable grip element of the present invention featuring a slide lock.
Figure 8A:
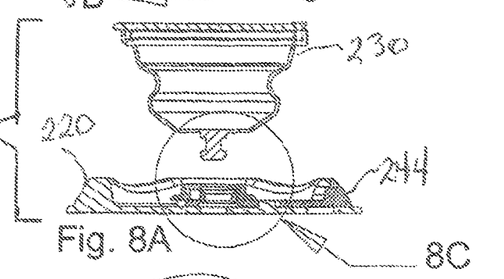
FIG. 8A is an exploded cross-sectional bottom view as seen along line 8A-8A in FIG. 8.
Figure 8B:
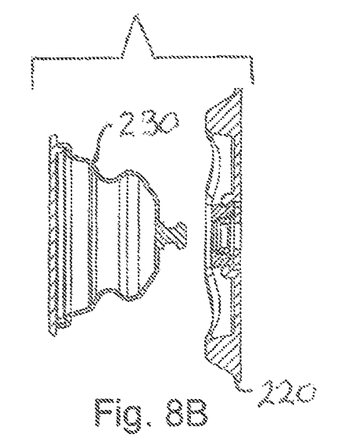
FIG. 8B is an exploded cross-sectional side view as seen along line 8B-8B in FIG. 8.
Figure 8C:
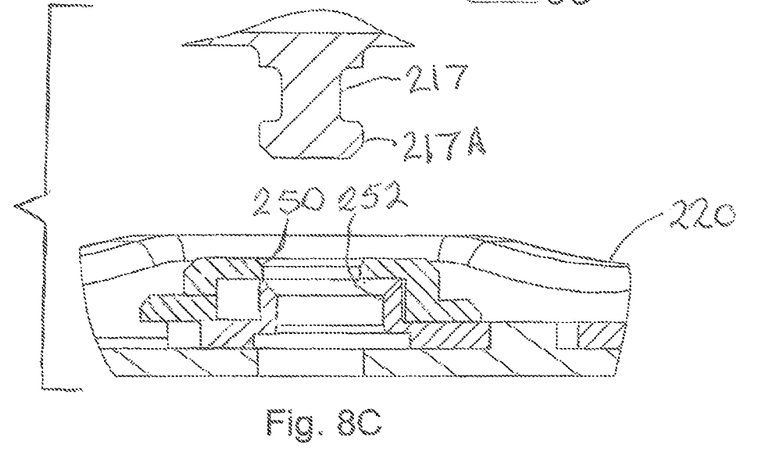
FIG. 8C is an enlarged exploded cross-sectional view as seen in circle 8C in FIG. 8A.
Figure 9A:
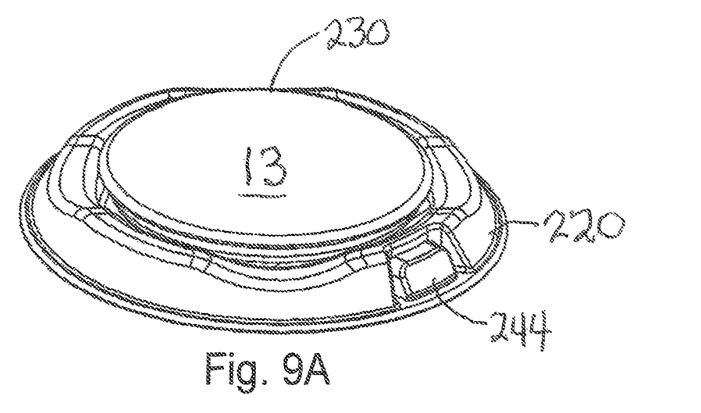
FIG. 9A is a front perspective view of the retractable grip element shown in FIG. 8.
Figure 9B:
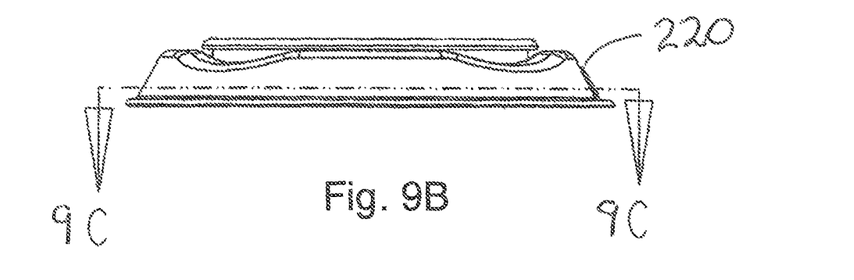
FIG. 9B is a side view of the retractable grip element shown in FIG. 9A.
Figure 9C:
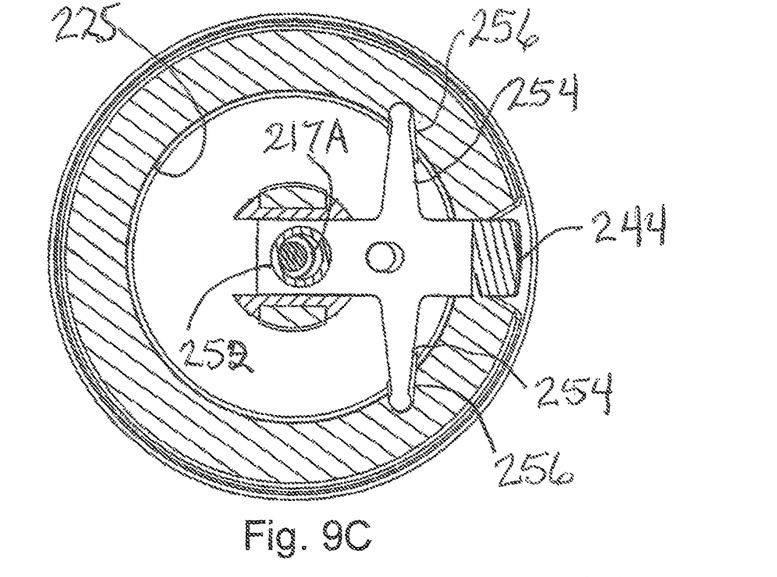
FIG. 9C is a cross-sectional top view as seen along line 9C-9C in FIG. 9B.

A fifth embodiment of the extendable and retractable grip element is shown in FIGS. 8-9C generally at 230. In this fifth embodiment, post 217 is affixed to the bottom or base 219 of extendable and retractable grip element 230. Alignable chimneys 250 (stationary on nest 220) and slidable chimney 252 on push button mechanism 240, serve to guide, capture and release radially outwardly extending flange 217A on post 217. As best seen in FIG. 9C, push button 244 has a pair of spring arms 254, ends of which are received in slots 256 in interior wall 225 of nest 220. Activation of push button 244 flexes spring arms 254 moving slidable chimney 252 from its misaligned (capturing) position (FIGS. 8C and 9C) to an aligned (releasing) position allowing extendable and retractable grip element 230 to be removed and replaced. In this manner, if grip shield 13 has a football team logo, it can be replaced with a grip shield featuring a baseball or basketball logo in the appropriate season. It also affords the opportunity to replace a worn element 230 without the expense of replacing the entire mechanism or phone case 11.

Figures 10, 10A, 10B:
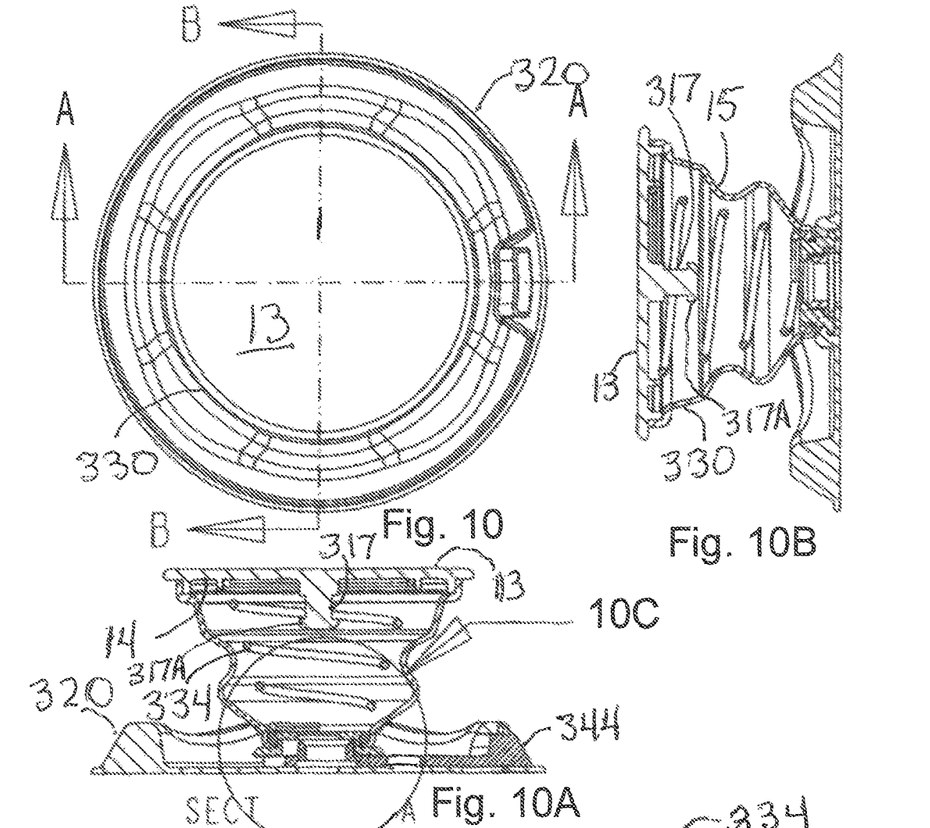
FIG. 10 is a top view of a sixth embodiment featuring a pop-up release slide.
FIG. 10A is a cross-sectional bottom view as seen along line 10A-10A in FIG. 10.
FIG. 10B is a cross-sectional side view as seen along line 10B-10B in FIG. 10; and, FIG. 10C is an enlarged side view as seen in circle 10C of FIG. 10A.
Figure 10C:
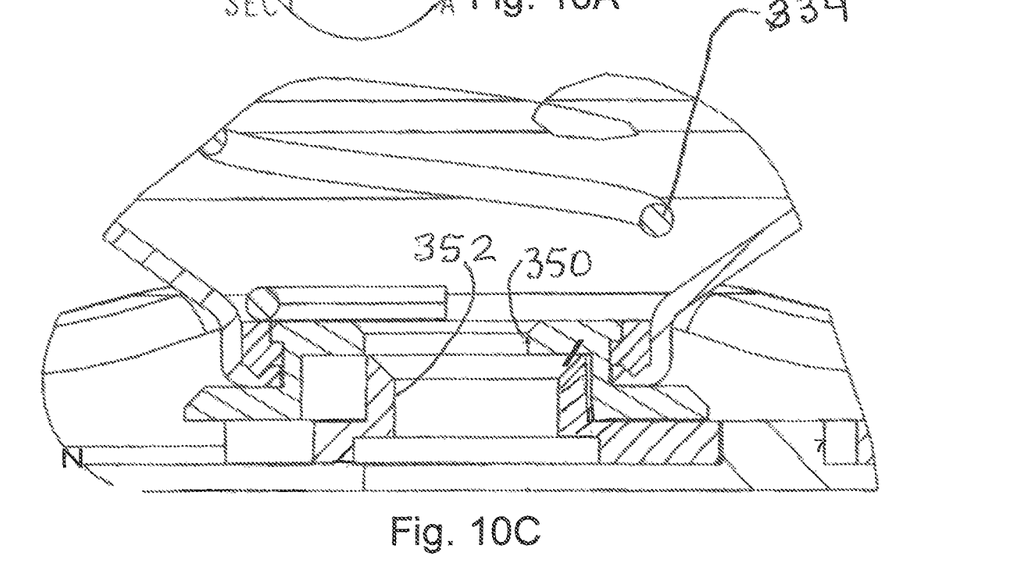

A sixth embodiment is shown in FIGS. 10-10C. Sixth embodiment 330 is structurally similar to the fifth embodiment and functionally equivalent to the fourth embodiment. Post 317 is attached to the undersurface 14 of grip shield 13. Alignable chimneys 350 and 352 guide, capture and release radially outwardly extending flange 317A on post 317, as in the previous embodiment. Collapsed coil spring 334 will expand accordion element 15 to its fully extended position without the need to engage the grip shield 13 manually.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. In an accessory for enhancing the grasping of a cell phone, the accessory having an extendable and collapsible grip element featuring an upper wall and a lower base being secured to a surface portion of a cell phone case, an improvement comprising:
   a) a downwardly protruding post, said downwardly protruding post having a radially outwardly extending flange protruding from a distal end;
   b) a radially inwardly extending flange associated with a securing element grasping a neck portion above said radially outwardly extending flange to secure said post wherein said radially inwardly extending flange is formed on a laterally moving slide element the extendable and collapsible grip element houses a coiled spring and said laterally moving slide element comprises a pushbutton release finger which, when engaged, allows said coiled spring within the extendable/collapsible grip element to extend automatically.

2. The improvement of claim 1 wherein said downwardly protruding post extends from a lower surface of said upper wall.

3. The improvement of claim 1 further comprising a cylindrical nest protruding from a portion of a surface portion of the case surrounding said extendable/collapsible grip element.

4. The improvement of claim 3 wherein said downwardly protruding post is attached to a lower portion of said base.

5. The improvement of claim 1 wherein said laterally moving slide element alternatively comprises a pushbutton release finger which, when engaged, allows said extendable and collapsible grip element to be removed from said nest.

6. The improvement of claim 5 wherein a pair of flexing arms extend from said laterally moving element and engage slots in an interior wall portion of said nest, said pair of flexing arms serving to bias said pushbutton release finger to a locked position.

7. In an accessory for enhancing the grasping of a cell phone, the accessory having an extendable and collapsible grip element featuring an upper wall and a lower base being secured to a surface portion of a cell phone case, an improvement comprising:
   a) a downwardly protruding post, said downwardly protruding post having a radially outwardly extending flange protruding from a distal end and being attached to a lower portion of said base;
   b) a radially inwardly extending flange associated with a securing element grasping a neck portion above said radial flange to secure said post;
   c) a cylindrical nest protruding from a portion of a surface portion of the case surrounding said extendable and collapsible grip element, said nest comprising a first upper element and a second lower element flexibly connected to said first upper element to permit modest pivotal clamshell expansion between said first upper element and said second lower element.

8. In an accessory for enhancing the grasping of a cell phone, the accessory having an extendable and collapsible grip element featuring an upper wall and a lower base being secured to a surface portion of a cell phone case, an improvement comprising:
   a) a downwardly protruding post, said downwardly protruding post having a radially outwardly extending flange protruding from a distal end;
   b) a radially inwardly extending flange associated with a securing element grasping a neck portion above said radial flange to secure said post, said radially inwardly extending flange being formed on a laterally moving slide element;
   c) the extendable and collapsible grip element housing a coiled spring and said laterally moving slide element comprising a pushbutton release finger which, when engaged, allows said coiled spring within the extendable/collapsible grip element to extend automatically;
   d) a cylindrical nest protruding from a portion of a surface portion of the case surrounding said extendable and collapsible grip element having inwardly extending, spring-biased buttons which flex outwardly to receive a plate secured to a bottom extent of said post on said extendable and collapsible grip element and flex inwardly to secure said plate and said extendable and collapsible grip element secured thereto.

* * * * *